US008098844B2

(12) United States Patent
Elko

(10) Patent No.: US 8,098,844 B2
(45) **Date of Patent: *Jan. 17, 2012**

(54) DUAL-MICROPHONE SPATIAL NOISE SUPPRESSION

(75) Inventor: Gary W. Elko, Summit, NJ (US)

(73) Assignee: MH Acoustics, LLC, Summit, NJ (US)

(*) Notice: Subject to any disclaimer, the term of this patent is extended or adjusted under 35 U.S.C. 154(b) by 887 days.

This patent is subject to a terminal disclaimer.

(21) Appl. No.: 12/089,545

(22) PCT Filed: Nov. 5, 2006

(86) PCT No.: PCT/US2006/044427

§ 371 (c)(1), (2), (4) Date: Apr. 8, 2008

(87) PCT Pub. No.: WO2007/059255

PCT Pub. Date: May 24, 2007

(65) Prior Publication Data

US 2008/0260175 A1 Oct. 23, 2008

Related U.S. Application Data

(63) Continuation-in-part of application No. 10/193,825, filed on Jul. 12, 2002, now Pat. No. 7,171,008.

(60) Provisional application No. 60/737,577, filed on Nov. 17, 2005, provisional application No. 60/354,650, filed on Feb. 5, 2002.

(51) Int. Cl.
*H04B 15/00* (2006.01)
*H04R 3/00* (2006.01)

(52) U.S. Cl. ....... 381/94.1; 381/92; 381/94.2; 381/94.3; 381/122

(58) Field of Classification Search .................... 381/92, 381/94.1, 122, 94.2, 94.3, 313
See application file for complete search history.

(56) References Cited

U.S. PATENT DOCUMENTS 3,626,365 A 12/1971 Press .............................. 340/34
4,281,551 A 8/1981 Gaudriot et al.
4,741,038 A 4/1988 Elko et al. ....................... 381/92
5,325,872 A 7/1994 Westermann ................ 128/897
5,473,701 A 12/1995 Cezanne et al.
(Continued)

FOREIGN PATENT DOCUMENTS

JP 10023590 A 1/1998
(Continued)

*Primary Examiner* — Vivian Chin
*Assistant Examiner* — Douglas Suthers
(74) *Attorney, Agent, or Firm* — Mendelsohn, Drucker & Associates, P.C.; Steve Mendelsohn

(57) ABSTRACT

Spatial noise suppression for audio signals involves generating a ratio of powers of difference and sum signals of audio signals from two microphones and then performing noise suppression processing, e.g., on the sum signal where the suppression is limited based on the power ratio. In certain embodiments, at least one of the signal powers is filtered (e.g., the sum signal power is equalized) prior to generating the power ratio. In a subband implementation, sum and difference signal powers and corresponding the power ratio are generated for different audio signal subbands, and the noise suppression processing is performed independently for each different subband based on the corresponding subband power ratio, where the amount of suppression is derived independently for each subband from the corresponding subband power ratio. In an adaptive filtering implementation, at least one of the audio signals can be adaptively filtered to allow for array self-calibration and modal-angle variability.

35 Claims, 10 Drawing Sheets

U.S. PATENT DOCUMENTS

| | | | | |
|---|---|---|---|---|
| 5,515,445 | A | 5/1996 | Baumhauer, Jr. et al. | 381/92 |
| 5,524,056 | A | 6/1996 | Killion et al. | 381/68.2 |
| 5,602,962 | A | 2/1997 | Kellermann | 395/235 |
| 5,610,991 | A | 3/1997 | Janse | 381/92 |
| 5,687,241 | A | 11/1997 | Ludvigsen | 381/68.4 |
| 5,878,146 | A | 3/1999 | Andersen | 381/312 |
| 5,982,906 | A | 11/1999 | Ono | |
| 6,041,127 | A | 3/2000 | Elko | |
| 6,272,229 | B1 | 8/2001 | Baekgaard | 381/313 |
| 6,292,571 | B1 | 9/2001 | Sjursen | 381/312 |
| 6,339,647 | B1 | 1/2002 | Andersen et al. | 381/312 |
| 6,584,203 | B2 | 6/2003 | Elko et al. | |
| 2003/0031328 | A1 | 2/2003 | Elko et al. | |
| 2003/0147538 | A1 | 8/2003 | Elko | |
| 2003/0206640 | A1 | 11/2003 | Malvar et al. | |
| 2004/0022397 | A1 | 2/2004 | Warren | |
| 2004/0165736 | A1 | 8/2004 | Hetherington et al. | |
| 2005/0276423 | A1 | 12/2005 | Aubauer et al. | 381/92 |
| 2009/0175466 | A1 | 7/2009 | Elko et al. | |
| 2009/0323982 | A1 | 12/2009 | Solbach et al. | |
| 2010/0329492 | A1 | 12/2010 | Derleth et al. | |

FOREIGN PATENT DOCUMENTS

| | | | |
|---|---|---|---|
| JP | 10126878 | A | 5/1998 |
| WO | WO 01/56328 | A | 8/2001 |
| WO | WO 01/69968 | A2 | 9/2001 |

DUAL-MICROPHONE SPATIAL NOISE SUPPRESSION

CROSS-REFERENCE TO RELATED APPLICATIONS

This application claims the benefit of PCT patent application no. PCT/US2006/044427 filed on Nov. 15, 2006, which is a continuation-in-part of U.S. patent application Ser. No. 10/193,825, filed on Jul. 12, 2002 and issued as U.S. Pat. No. 7,171,008 on Jan. 30, 2007, which claimed the benefit of the filing date of U.S. provisional application No. 60/354,650, filed on Feb. 5, 2002, the teachings of all three of which are incorporated herein by reference. PCT patent application no. PCT/US2006/044427 also claims the benefit of the filing date of U.S. provisional application No. 60/737,577, filed on Nov. 17, 2005, the teachings of which are incorporated herein by reference.

BACKGROUND OF THE INVENTION

1. Field of the Invention

The present invention relates to acoustics, and, in particular, to techniques for reducing room reverberation and noise in microphone systems, such as those in laptop computers, cell phones, and other mobile communication devices.

2. Description of the Related Art

Interest in simple two-element microphone arrays for speech input into personal computers has grown due to the fact that most personal computers have stereo input and output. Laptop computers have the problem of physically locating the microphone so that disk drive and keyboard entry noises are minimized. One obvious solution is to locate the microphone array at the top of the LCD display. Since the depth of the display is typically very small (laptop designers strive to minimize the thickness of the display), any directional microphone array will most likely have to be designed to operate as a broadside design, where the microphones are placed next to each other along the top of the laptop display and the main beam is oriented in a direction that is normal to the array axis (the display top, in this case).

It is well known that room reverberation and noise are typical problems when using microphones mounted on laptop or desktop computers that are not close to the talker's mouth. Unfortunately, the directional gain that can be attained by the use of only two acoustic pressure microphones is limited to first-order differential patterns, which have a maximum gain of 6 dB in diffuse noise fields. For two elements, the microphone array built from pressure microphones can attain the maximum directional gain only in an endfire arrangement. For implementation limitations, the endfire arrangement dictates microphone spacing of more than 1 cm. This spacing might not be physically desired, or one may desire to extend the spatial filtering performance of a single endfire directional microphone by using an array mounted on the display top edge of a laptop PC.

Similar to the laptop PC application is the problem of noise pickup by mobile cell phones and other portable communication devices such as communication headsets.

SUMMARY OF THE INVENTION

Certain embodiments of the present invention relate to a technique that uses the acoustic output signal from two microphones mounted side-by-side in the top of a laptop display or on a mobile cell phone or other mobile communication device such as a communication headset. These two microphones may themselves be directional microphones such as cardioid microphones. The maximum directional gain for a simple delay-sum array is limited to 3 dB for diffuse sound fields. This gain is attained only at frequencies where the spacing of the elements is greater than or equal to one-half of the acoustic wavelength. Thus, there is little added directional gain at low frequencies where typical room noise dominates. To address this problem, certain embodiments of the present invention employ a spatial noise suppression (SNS) algorithm that uses a parametric estimation of the main signal direction to attain higher suppression of off-axis signals than is possible by classical linear beamforming for two-element broadside arrays. The beamformer utilizes two omnidirectional or first-order microphones, such as cardioids, or a combination of an omnidirectional and a first-order microphone that are mounted next to each other and aimed in the same direction (e.g., towards the user of the laptop or cell phone).

Essentially, the SNS algorithm utilizes the ratio of the power of the differenced array signal to the power of the summed array signal to compute the amount of incident signal from directions other than the desired front position. A standard noise suppression algorithm, such as those described by S. F. Boll, "Suppression of acoustic noise in speech using spectral subtraction," *IEEE Trans. Acoust. Signal Proc*., vol. ASSP-27, April 1979, and E. J. Diethorn, "Subband noise reduction methods," *Acoustic Signal Processing for Telecommunication*, S. L. Gay and J. Benesty, eds., Kluwer Academic Publishers, Chapter 9, pp. 155-178, March 2000, the teachings of both of which are incorporated herein by reference, is then adjusted accordingly to further suppress undesired off-axis signals. Although not limited to using directional microphone elements, one can use cardioid-type elements, to remove the front-back symmetry and minimizes rearward arriving signals. By using the power ratio of the two (or more) microphone signals, one can estimate when a desired source from the broadside of the array is operational and when the input is diffuse noise or directional noise from directions off of broadside. The ratio measure is then incorporated into a standard subband noise suppression algorithm to affect a spatial suppression component into a normal single-channel noise-suppression processing algorithm. The SNS algorithm can attain higher levels of noise suppression for off-axis acoustic noise sources than standard optimal linear processing.

In one embodiment, the present invention is a method for processing audio signals, comprising the steps of (a) generating an audio difference signal; (b) generating an audio sum signal; (c) generating a difference-signal power based on the audio difference signal; (d) generating a sum-signal power based on the audio sum signal; (e) generating a power ratio based on the difference-signal power and the sum-signal power; (f) generating a suppression value based on the power ratio; and (g) performing noise suppression processing for at least one audio signal based on the suppression value to generate at least one noise-suppressed output audio signal.

In another embodiment, the present invention is a signal processor adapted to perform the above-reference method. In yet another embodiment, the present invention is a consumer device comprising two or more microphones and such a signal processor.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 14 shows spatial suppression for 4-cm spaced cardioid microphones with a maximum suppression level of 10 dB at 1 kHz, while

DETAILED DESCRIPTION

Derivation

Figure 1:
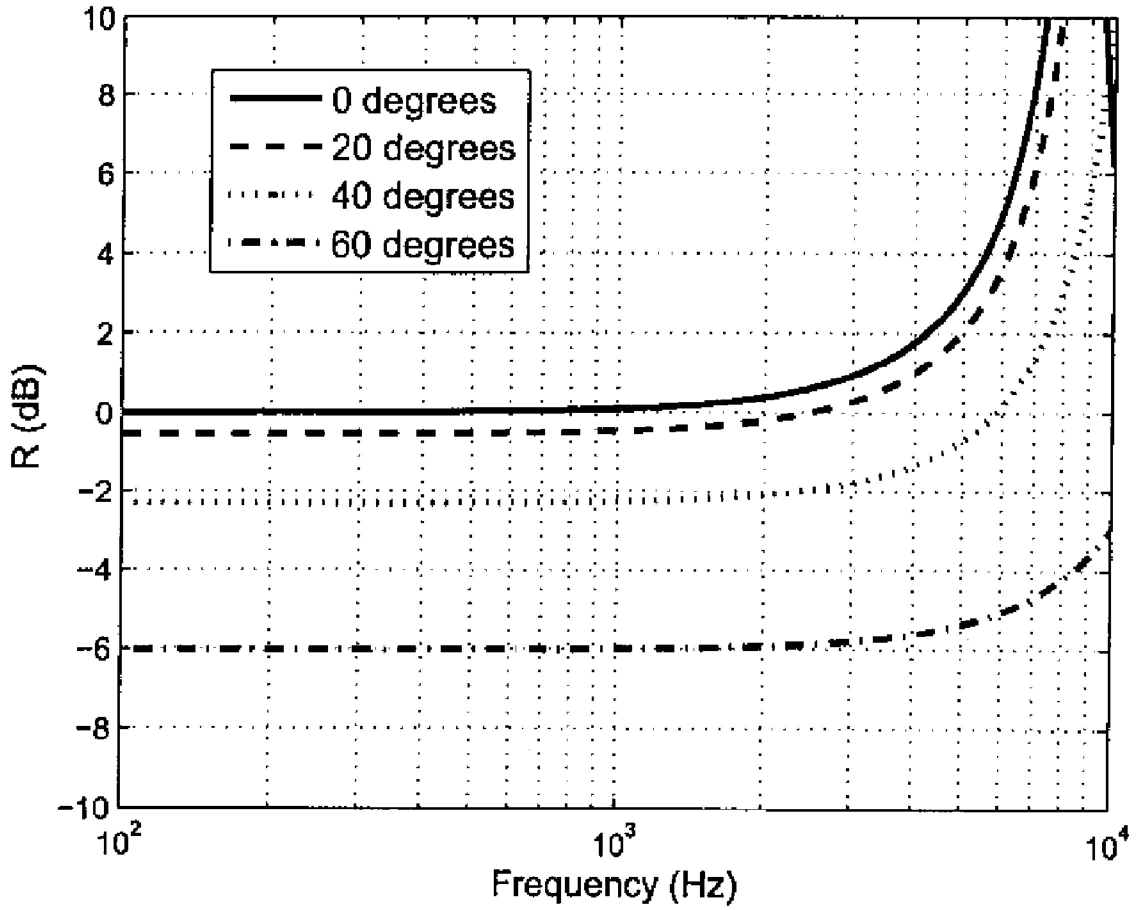
FIG. 1 is a plot of the ratio of Equation (3) for a microphone spacing of d=2.0 cm, of the output powers of the difference array relative to the filtered sum array for frequencies from 100 Hz to 10 kHz for a 2-cm spaced array for various angles of incidence of a farfield planewave.

To begin, assume that two nondirectional microphones are spaced a distance of d meters apart. The magnitude array response S of the array formed by summing the two microphone signals is given by Equation (1) as follows:

$$S(\omega,\theta)=2\left|\cos\left(\frac{kd\cos(\theta)}{2}\right)\right|, \tag{1}$$

where k=ω/c is the wavenumber, ω is the angular frequency, and c is the speed of sound (m/s), and θis defined as the angle relative to the array axis. If the two elements are subtracted, then the array magnitude response D can be written as Equation (2) as follows:

$$D(\omega,\theta)=2\left|\sin\left(\frac{kd\cos(\theta)}{2}\right)\right|. \tag{2}$$

An important design feature that can impact the design of any beamformer design is that both of these functions are periodic in frequency. This periodic phenomenon is also referred to as spatial aliasing in beamforming literature. In order to remove frequency ambiguity, the distance d between the microphones is typically chosen so that there is no aliasing up to the highest operating frequency. The constraint that occurs here is that the microphone element spacing should be less than one wavelength at the highest frequency. One may note that this value is twice the spacing that is typical in beamforming design. But the sum and difference array do not both incorporate steering, which in turn introduces the one-wavelength spacing limit. However, if it is desired to allow modal variation of the array relative to the desired source, then some time delay and amplitude matching would be employed. Allowing time-delay variation is equivalent to "steering" the array and therefore the high-frequency cutoff will be lower. However, off-axis nearfield sources would not exhibit these phenomena due to the fact that these source locations result in large relative level differences between the microphones.

As stated in the Summary, the detection measure for the spatial noise suppression (SNS) algorithm is based on the ratio of powers from the differenced and summed closely spaced microphones. The power ratio $\Re_N$ for a plane-wave impinging at an angle θ relative to the array axis is given by Equation (3) as follows:

$$\Re(\omega,\theta)=\tan^2\left(\frac{kd\cos(\theta)}{2}\right). \tag{3}$$

For small values of kd, Equations (1) and (2) can be reduced to Equations (4) and (5), respectively, as follows:

$$S(\omega,\theta)\approx 2 \tag{4}$$

$$D(\omega,\theta)\approx|kd\cos(\theta)| \tag{5}$$

and therefore Equation (3) can be expressed by Equation (6) as follows:

$$\Re(\omega,\theta)\approx\frac{(kd)^2\cos^2(\theta)}{4}. \tag{6}$$

These approximations are valid over a fairly large range of frequencies for arrays where the spacing is below the one-wavelength spacing criterion. In Equation (5), it can be seen that the difference array has a first-order high-pass frequency response. Equation (4) does not have frequency dependence. In order to have a roughly frequency-independent ratio, either the sum array can be equalized with a first-order high-pass response or the difference array can be filtered through a first-order low-pass filter with appropriate gain. For the implementation of the SNS algorithm described in this specification, the first option was chosen, namely to multiply the sum array output by a filter whose gain is ωd/(2c). In other implementations, the difference array can be filtered or both the sum and difference arrays can be appropriately filtered. After applying a filter to the sum array with the first-order high-pass response kd/2, the ratio of the powers of the difference and sum arrays yields Equation (7) as follows:

$$\hat{\Re}(\theta)\approx\cos^2(\theta) \tag{7}$$

where the "hat" notation indicates that the sum array is multiplied (filtered) by kd/2. (To be more precise, one could filter with sin(kd/2)/cos(kd/2).) Equation (7) is the main desired result. We now have a measure that can be used to decrease the off-axis response of an array. This measure has the desired quality of being relatively easy to compute since it requires only adding or subtracting signals and estimating powers (multiply and average).

FIG. 1 is a plot of the ratio of Equation (3) for a microphone spacing of d=2.0 cm, of the output powers of the difference array relative to the filtered sum array for frequencies from 100 Hz to 10 kHz for a 2-cm spaced array for various angles of incidence of a farfield planewave. The angle θ is defined as the angle from endfire (i.e., the direction along the line that connects the two microphones), such that θ=0 degrees corresponds to endfire and θ=90 degrees corresponds to broadside incidence.

In general, any angular suppression function could be created by using $\Re_N(\theta)$ to estimate θ and then applying a desired suppression scheme. Of course, this is a simplified view of the problem since, in reality, there are many simultaneous signals impinging on the array, and the net effect will be an average $\Re_N$. A good model for typical spatial noise is a diffuse field, which is an idealized field that has uncorrelated signals coming from all directions with equal probability. A diffuse field is also sometimes referred to as a spherically isotropic acoustic field.

Diffuse Spatial Noise

The diffuse-field power ratio can be computed by integrating the $\Re_N$ function over the surface of a sphere. Since the two-element array is axisymmetric, this surface integral can be reduced to a line integral given by Equation (8) as follows:

$$\Re_{diffuse} = \int_0^{\pi} \cos^2(\theta)\sin(\theta)d\theta = 1/3 \quad (8)$$

Figure 2:
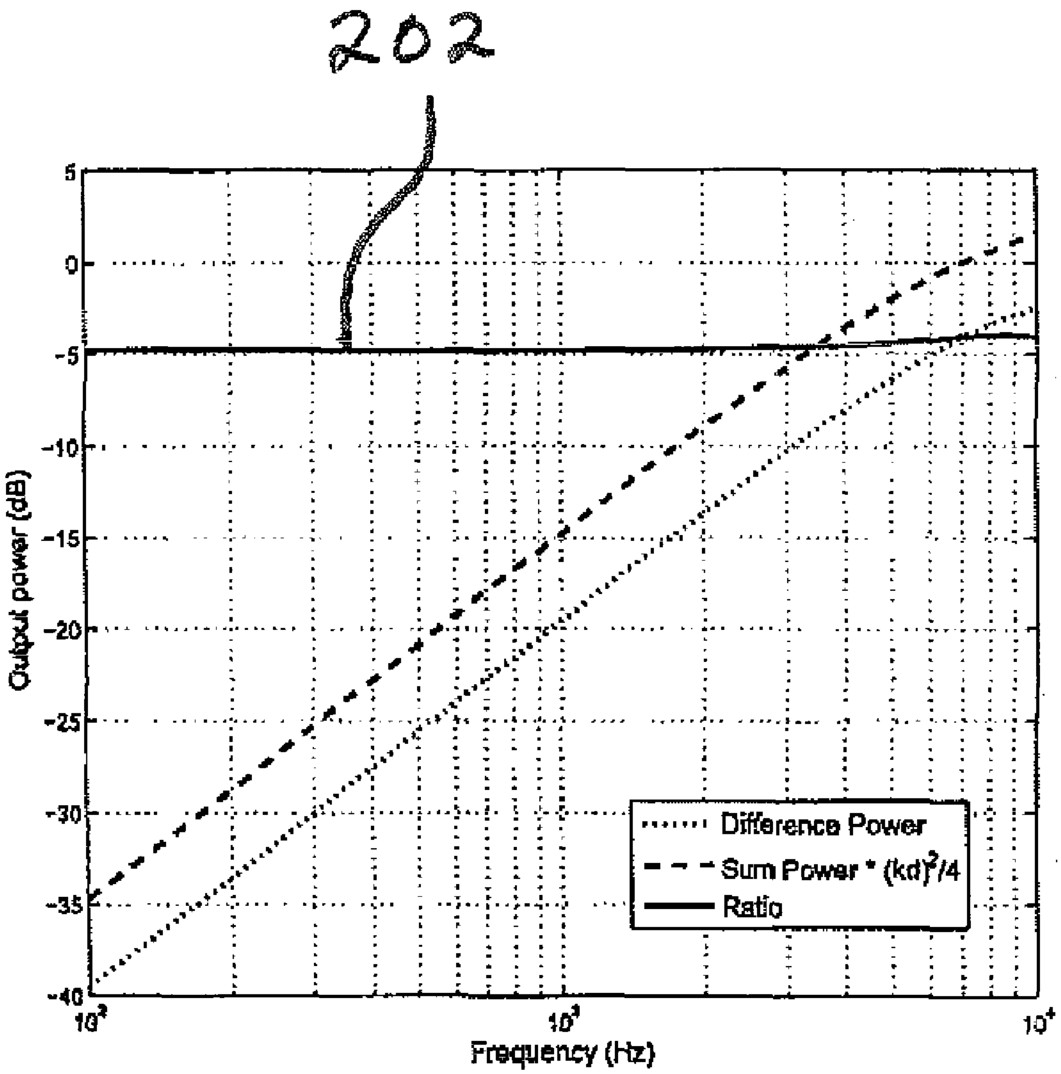
FIG. 2 is a plot of Equation (3) integrated over all incident angles of uncorrelated noise (the diffuse field assumption)

FIG. 2 is a plot of Equation (3) integrated over all incident angles of uncorrelated noise (the diffuse field assumption). In particular, FIG. 2 shows the output powers of the difference array and the filtered sum array (filtered by kd/2) and the corresponding ratio $\Re_N$ for a 2-cm spaced array in a diffuse sound field. Note that curve 202 is the spatial average of $\Re_N$ at lower frequencies and is equal to −4.8 dB. It should not be a surprise that the log of the integral is equal to −4.8 dB, since the spatial integral of $\hat{\Re}$ is the inverse of the directivity factor of a dipole microphone, which is the effective beampattern of the difference between both microphones.

It is possible that the desired source direction is not broadside to the array, and therefore one would need to steer the single null to the desired source pattern for the difference array could be any first-order differential pattern. However, as the first-order pattern is changed from dipole to other first-order patterns, the amplitude response from the preferred direction (the direction in which the directivity index is maximum) increases. At the extreme end of steering the first-order pattern to endfire (a cardioid pattern), the difference array output along the endfire increases by 6 dB. Thus, the value for $\Re_N$ will increase from −4.8 dB to 1.2 dB as the microphone moves from dipole to cardioid. As a result, the spatial average of $\Re_N$ for this more-general case for diffuse sound fields can reach a minimum of −4.8 dB.

Thus, one can write explicit limits for all far-field diffuse noise fields when the minimized difference signal is formed by a first-order differential pattern according to Equation (9) as follows:

$$-4.8\text{ dB} \leq \Re_N \leq 1.2\text{ dB} \quad (9)$$

One simple and straightforward way to reduce the range of $\Re_N$ would be to normalize the gain variation of the differential array when the null is steered from broadside to endfire to aim at a source that is not arriving from the broadside direction. Performing this normalization, $\Re_N$ can obtain only negative values of the directivity index for all first-order two-element differential microphones arrays. Thus one can write, $$-6.0\text{ dB} \leq \Re_N \leq 4.8\text{ dB}. \quad (10)$$

Figure 3:
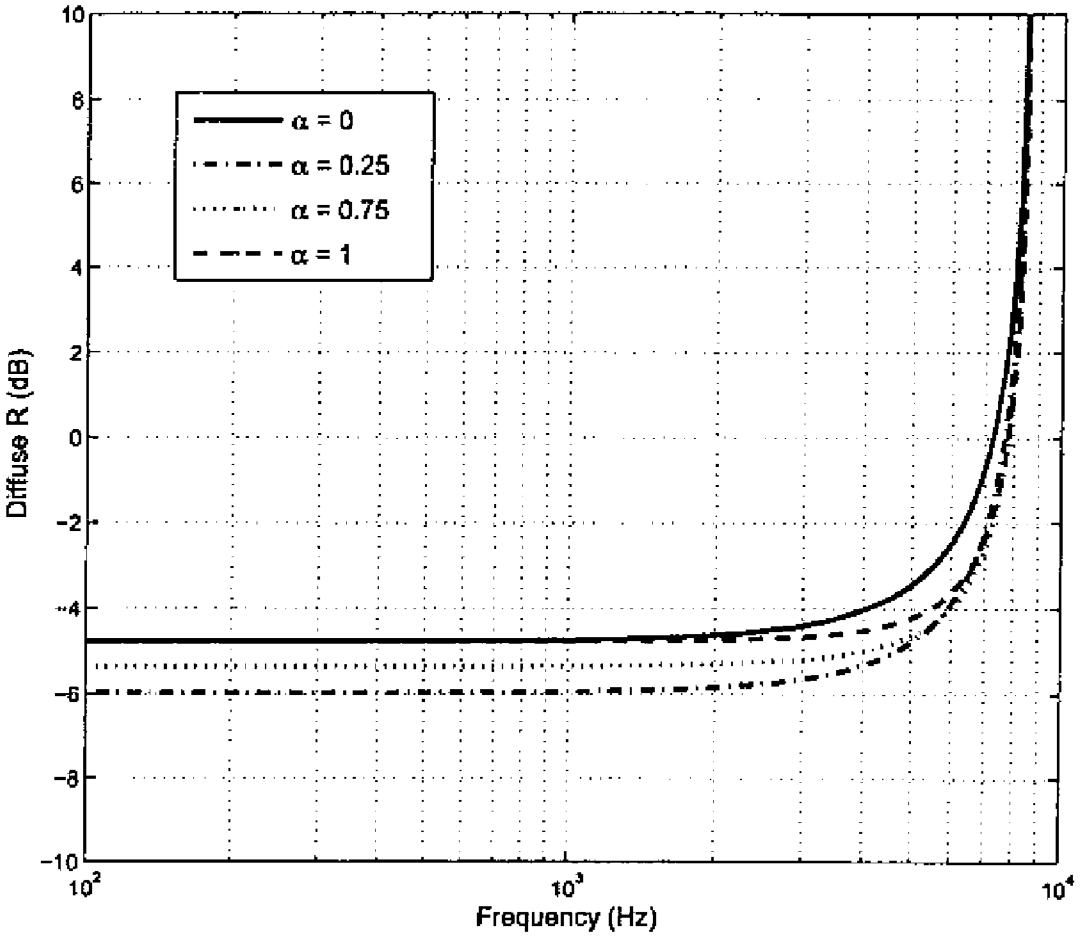
FIG. 3 shows the variation in the power ratio $\Re_N$ as a function of first-order microphone type when the first-order microphone level variation is normalized.

FIG. 3 shows the variation in the power ratio $\Re_N$ as a function of first-order microphone type when the first-order microphone level variation is normalized. In particular, FIG. 3 shows the ratio of the output power of the difference array relative to the output power of the filtered sum array (filtered by kd/2) for a 2-cm spaced array in a diffuse sound field for different values of first-order parameter α. The first-order parameter α defines the directivity as T(θ)=α+cos(θ). Thus, α=0 is a dipole, α=0.25 is a hypercardioid, and α=1 is a cardioid.

Another approach that bounds the minimum of $\Re_N$ for a diffuse field is based on the use of the spatial coherence function for spaced omnidirectional microphones in a diffuse field. The space-time correlation function $R_{12}(r, \tau)$ for stationary random acoustic pressure processes $p_1$ and $p_2$ is defined by Equation (11) as follows:

$$R_{12}(r, \tau) = E[p_1(s,t)p_2(s-r,t-\tau)] \quad (11)$$

where E is the expectation operator, s is the position of the sensor measuring acoustic pressure $p_1$, and r is the displacement vector to the sensor measuring acoustic pressure $p_2$. For a plane-wave incident field with wavevector k (where $\|k\|=k=\omega/c$ where c is the speed of sound), $p_2$ can be written according to Equation (12) as follows:

$$p_2(s,t) = p_1(s-r,t-k^T r), \quad (12)$$

where T is the transpose operator. Therefore, Equation (11) can be expressed as Equation (13) as follows:

$$R_{12}(r, \tau) = R(\tau + k^T r) \quad (13)$$

where R is the spatio-temporal autocorrelation function of the acoustic pressure p. The cross-spectral density $S_{12}$ is the Fourier transform of the cross-correlation function given by Equation (14) as follows:

$$S_{12}(r,\omega) = \int R_{12}(r,\tau)e^{j\omega\tau}d\tau \quad (14)$$

If we assume that the acoustic field is spatially homogeneous (such that the correlation function is not dependent on the absolute position of the sensors) and also assume that the field is diffuse (uncorrelated signals from all direction), then the vector r can be replaced with a scalar variable d, which is the spacing between the two measurement locations. Thus, the cross-spectral density for an isotropic field is the average cross-spectral density for all spherical directions, θ, ϕ. Therefore, Equation (14) can be expressed as Equation (15) as follows:

$$\begin{aligned} S_{12}(d, \omega) &= \frac{N_o(\omega)}{4\pi} \int_0^{\pi} \int_0^{2\pi} e^{-jkd\cos\theta} \sin\theta d\theta d\phi \\ &= \frac{N_o(\omega)\sin(\omega d/c)}{\omega d/c} \\ &= \frac{N_o(\omega)\sin(kd)}{kd} \end{aligned} \quad (15)$$

where $N_o(\omega)$ is the power spectral density at the measurement locations and it has been assumed without loss in generality that the vector r lies along the z-axis. Note that the isotropic assumption implies that the power spectral density is the same at each location. The complex spatial coherence function γ is defined as the normalized cross-spectral density according to Equation (16) as follows:

$$\gamma_{12}(d,\omega)=\frac{S_{12}(d,\omega)}{[S_{11}(\omega)S_{22}(\omega)]^{1/2}} \tag{16}$$

For diffuse noise and omnidirectional receivers, the spatial coherence function is purely real, such that Equation (17) results as follows:

$$\gamma(d,\omega)=\frac{\sin(kd)}{kd}. \tag{17}$$

The output power spectral densities of the sum signal ($S_{aa}(\omega)$) and the minimized difference signal ($S_{dd}(\omega)$), where the minimized difference signal contains all uncorrelated signal components between the microphone channels, can be written as Equations (18) and (19) as follows:

$$\begin{aligned}S_{dd}(d,\omega)&=N_o(\omega)[1-\gamma(d,\omega)]^2\\&=N_o(\omega)\left(1-\frac{\sin(kd)}{kd}\right)^2\end{aligned} \tag{18}$$

and $$\begin{aligned}S_{aa}(d,\omega)&=N_o(\omega)[1+\gamma(d,\omega)]^2\\&=N_o(\omega)\left(1+\frac{\sin(kd)}{kd}\right)^2\end{aligned} \tag{19}$$

Taking the ratios of Equation (18) and Equation (19) normalized by kd/2 yields Equation (20) as follows:

$$\begin{aligned}\max\{\Re_N(d,\omega)\}&=\frac{1-\frac{\sin(kd)}{kd}}{(kd/2)^2\left(1+\frac{\sin(kd)}{kd}\right)}\\&\approx\frac{1}{3}\end{aligned} \tag{20}$$

where the approximation is reasonable for $kd/2 \ll \pi$. Converting to decibels results in Equation (21) as follows:

$$\min\{\Re_N(\omega,d)\}\approx -4.8\text{ dB}, \tag{21}$$

which is the same result obtained previously. Similar equations can be written if one allows the single first-order differential null to move to any first-order pattern. Since it was shown that $\Re_N$ for diffuse fields is equal to minus the directivity index, the minimum value of $\Re_N$ is equal to the negative of the maximum directivity index for all first-order patterns, i.e., $$\min\{\Re_N(\omega,d)\}\approx -6.0\text{ dB}. \tag{22}$$

Although the above development has been based on the use of omnidirectional microphones, it is possible that some implementations might use first-order or even higher-order differential microphones. Thus, similar equations can be developed as above for directional microphones or even the combination of various orders of individual microphones used to form the array.

Basic Algorithm Implementation

From Equation (7), it can be seen that, for a propagating acoustic wave, $0 \leqq \Re \leqq 1$. For wind-noise, this ratio greatly exceeds unity, which is used to detect and compute the suppression of wind-noise as in the electronic windscreen algorithm described in U.S. patent application Ser. No. 10/193,825.

From the above development, it was shown that the power ratio between the difference and sum arrays is a function of the incident angle of the signal for the case of a single propagating wave sound field. For diffuse fields, the ratio is a function of the directivity of the microphone pattern for the minimized difference signal.

The spatial noise suppression algorithm is based on these observations to allow only signals propagating from a desired speech direction or position and suppress signals propagating from other directions or positions. The main problem now is to compute an appropriate suppression filter such that desired signals are passed, while off-axis and diffuse noise fields are suppressed, without the introduction of spurious noise or annoying distortion. As with any parametric noise suppression algorithm, one cannot expect that the output signal will have increased speech intelligibility, but would have the desired effect to suppress unwanted background noise and room reverberation. One suppression function would be to form the function C defined (for broadside steering) according to Equation (23) as follows:

$$C(\theta)=1-\Re_N(\theta)=\sin^2\theta. \tag{23}$$

A practical issue is that the function C has a minimum gain of 0. In a real-world implementation, one could limit the amount of suppression to some maximum value defined according to Equation (24) as follows:

$$C_{lim}(\theta)=\max\{C(\theta),C_{min}\} \tag{24}$$

A more-flexible suppression algorithm would allow algorithm tuning to allow a general suppression function that limits that suppression to certain preset bounds and trajectories. Thus, one has to find a mapping that allows one to tailor the suppression preferences.

Figure 4:
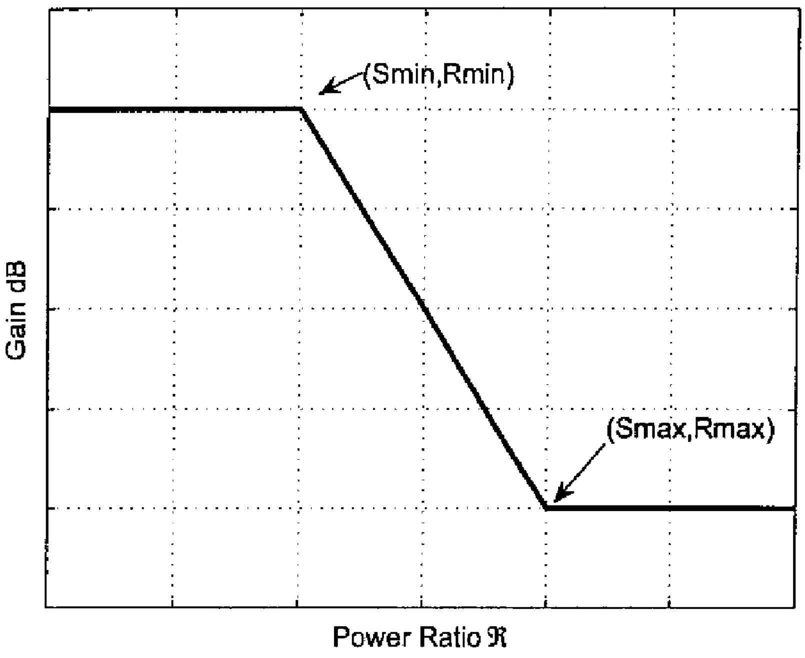
FIG. 4 shows the general SNS suppression level as a function of $\Re$.

As a starting point for the design of a practical algorithm, it is important to understand any constraints due to microphone sensor mismatch and inherent noise. FIG. 1 shows the ratio of powers as a function of incident angle. In any practical implementation, there would be noise and mismatch between the microphones that would place a physical limit on the minimum of $\Re_N$ for broadside. The actual limit would also be a function of frequency since microphone self-noise typically has a 1/f spectral shape due to electret preamplifier noise (e.g., the FET used to transform the high output impedance of the electret to a low output impedance to drive external electronics). Also, it would be reasonable to assume that the microphones will have some amplitude and phase error. (Note that this problem is eliminated if one uses an adaptive filter to "match" the two microphone channel signals. This is described in more detail later in this specification.) Thus, it would be prudent to limit the expected value of the minimum power ratio from the difference and sum arrays to some prescribed level. This minimum level is denoted as $\Re_N$ A conservative value for $\Re_{min}$ would be 0.01, which corresponds to $\Re_N=-20$ dB. At the other end, it would be expedient to also limit the other extreme value or $\Re_N$ to correspond to the maximum value of suppression. These minimum and maximum values are functions of frequency to reflect the impact of noise and mismatch effects as a function of frequency. To keep the exposition from getting to far off the main theme, let's assume for now that there is no frequency dependence in $\tilde{\Re}$, where the "tilde" is used to denote a range-limited estimate of $\tilde{\Re}$. A straightforward scaling would be to constrain the suppression level between 0 dB and a maximum selected by the user as $S_{max}$. This suppression range could be mapped onto the limit values of $\Re_N$ and $\Re_N$ as shown in FIG. 4, which shows the general SNS suppression level as a function of $\hat{\Re}$.

Figure 5:
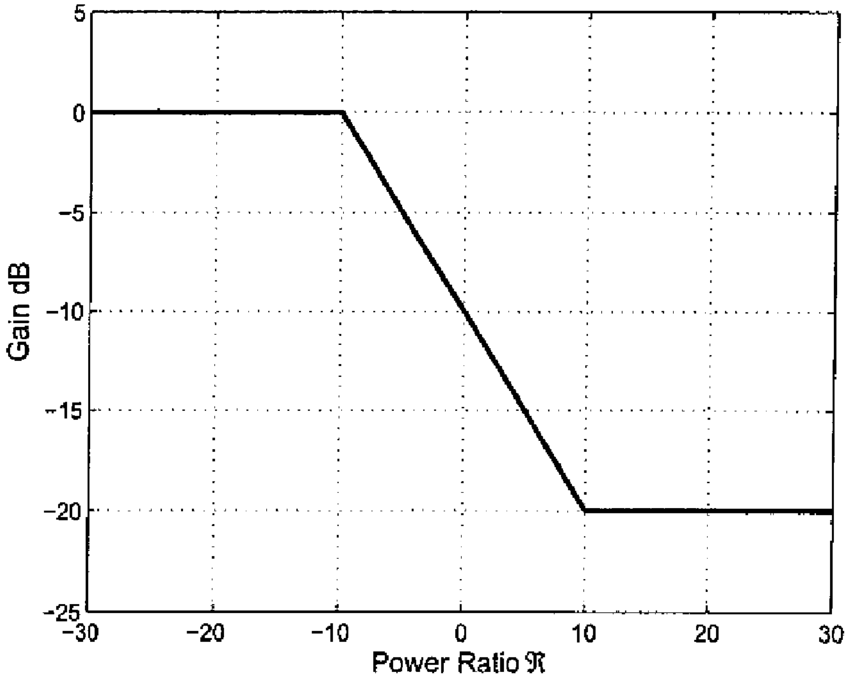
FIG. 5 shows one suppression function for various values of $\Re$.
Figure 6:
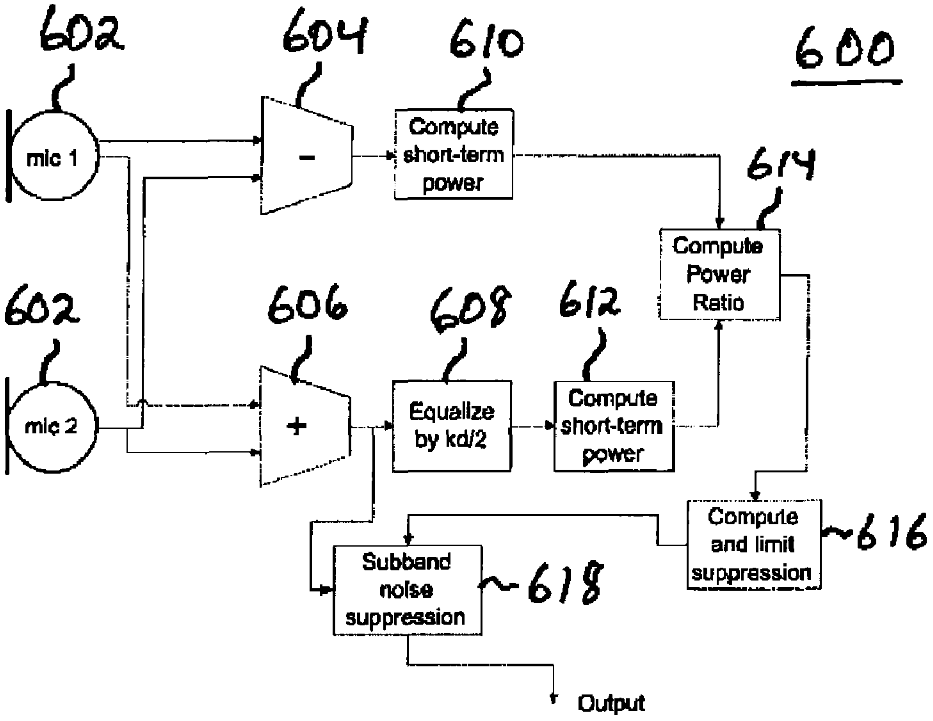
FIG. 6 shows a block diagram of a two-element microphone array spatial noise suppression system according to one embodiment of the present invention.

A straight-line curve in log-log space is a potential suppression function. Of course, any mapping could be chosen via a polynomial equation fit for a desired suppression function or one could use a look-up table to allow for any general mapping. FIG. 5 shows one suppression function for various values of $\Re_N$. In particular, FIG. 5 shows suppression level S versus power ratio $\Re_N$ for 20-dB maximum suppression (−20 dB gain in the figure) with a suppression level of 0 dB (unity gain) when $\Re_N<0.1$. For subband implementations, one could also have the ability to use unique suppression functions as a function of frequency. This would allow for a much more general implementation and would probably be the preferred mode of implementation for subband designs. Of course, one could in practice define any general function that maps the gain, which is simply the negative in dB of the suppression level, as a function of $\Re_N$ FIG. 6 shows a block diagram of a two-element microphone array spatial noise suppression system 600, according to one embodiment of the present invention. As shown in FIG. 6, the signals from two microphones 602 are differenced (604) and summed (606). The sum signal is equalized by convolving the sum signal with a (kd/2) high-pass filter (608), and the short-term powers of the difference signal (610) and the equalized sum signal (612) are calculated. In a frequency-domain implementation, the sum signal is equalized by multiplying the frequency components of the sum signal by (kd/2). The difference signal power and the equalized sum signal power are used to compute the power ratio $\Re_N$(614), which is then used to determine (e.g., compute and limit) the suppression level (616) used to perform (e.g., conventional) subband noise suppression (618) on the sum signal to generate a noise-suppressed, single-channel output signal. In alternative embodiments, subband noise suppression processing can be applied to the difference signal instead of or in addition to being applied to the sum signal.

In an alternative implementation of SNS system 600, difference and sum blocks 604 and 606 can be eliminated by using a directional (e.g., cardioid) microphone to generate the difference signal applied to power block 610 and a non-directional (e.g., omni) microphone to generate the sum signal applied to equalizer block 608.

Figure 7:
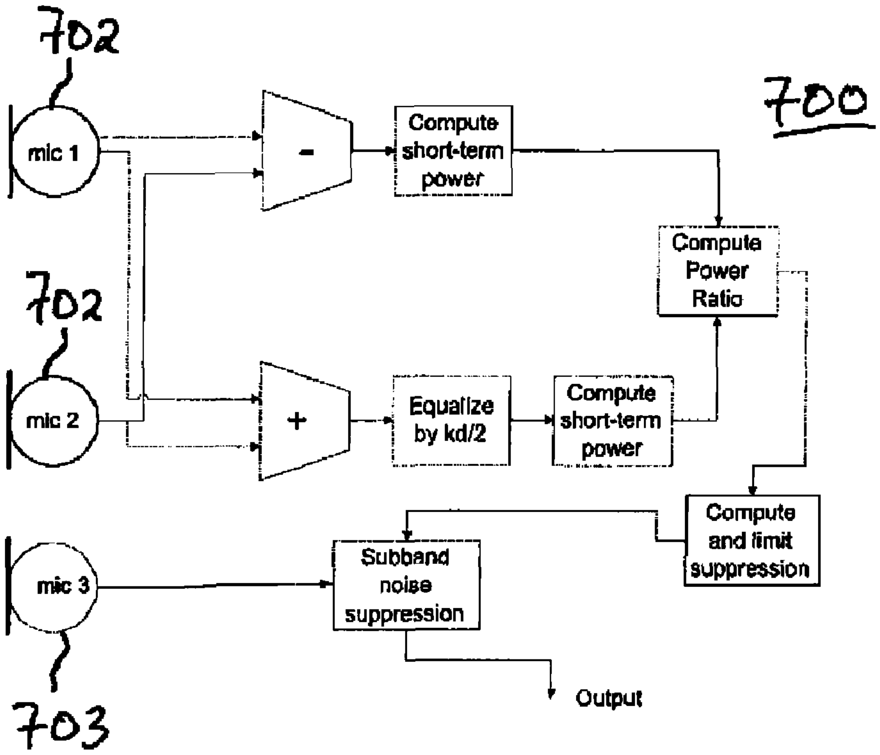
FIG. 7 shows a block diagram of three-element microphone array spatial noise suppression system according to another embodiment of the present invention.

FIG. 7 shows a block diagram of three-element microphone array spatial noise suppression system 700, according to another embodiment of the present invention. SNS system 700 is similar to SNS system 600 of FIG. 6 with analogous elements performing analogous functions, except that, in SNS system 700, two sensing microphones 702 are used to compute the suppression level that is then applied to a separate third microphone 703. One might choose this implementation if the third microphone is of high-quality and the two sensing microphones are either of lower quality and/or less expensive. In one application of this embodiment, the third microphone is a close-talking microphone, and wide-band suppression is applied to the audio signal generated by that close-talking microphone using a suppression level derived from the two sensing microphones.

Figure 8:
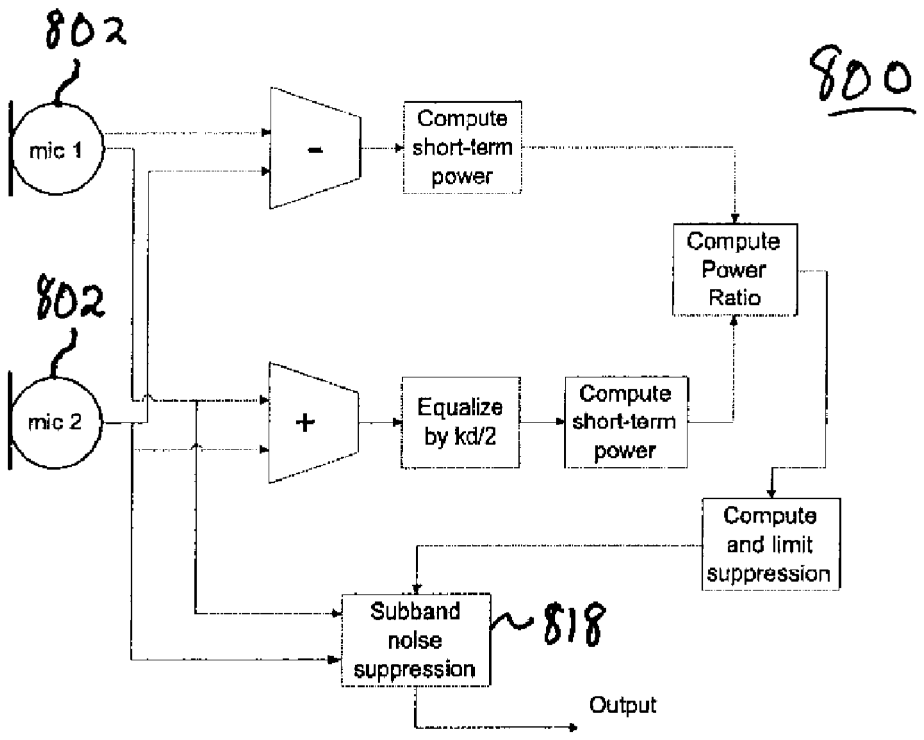
FIG. 8 shows a block diagram of stereo microphone array spatial noise suppression system according to yet another embodiment of the present invention.

FIG. 8 shows a block diagram of stereo microphone array spatial noise suppression system 800, according to yet another embodiment of the present invention. SNS system 800 is similar to SNS system 600 of FIG. 6 with analogous elements performing analogous functions, except that, in SNS system 800, the calculated suppression level is used to perform subband noise suppression 818 on two stereo channels from microphones 802. In this case, the two microphones might themselves be directional microphones oriented to obtain a stereo signal. One could also combine two omnidirectional microphones to form a desired stereo output beam and then process both of these signals by the spatial noise suppression system. A typical practical implementation would be to apply the same suppression level to both channels in order to preserve the true stereo signal.

Figure 9:
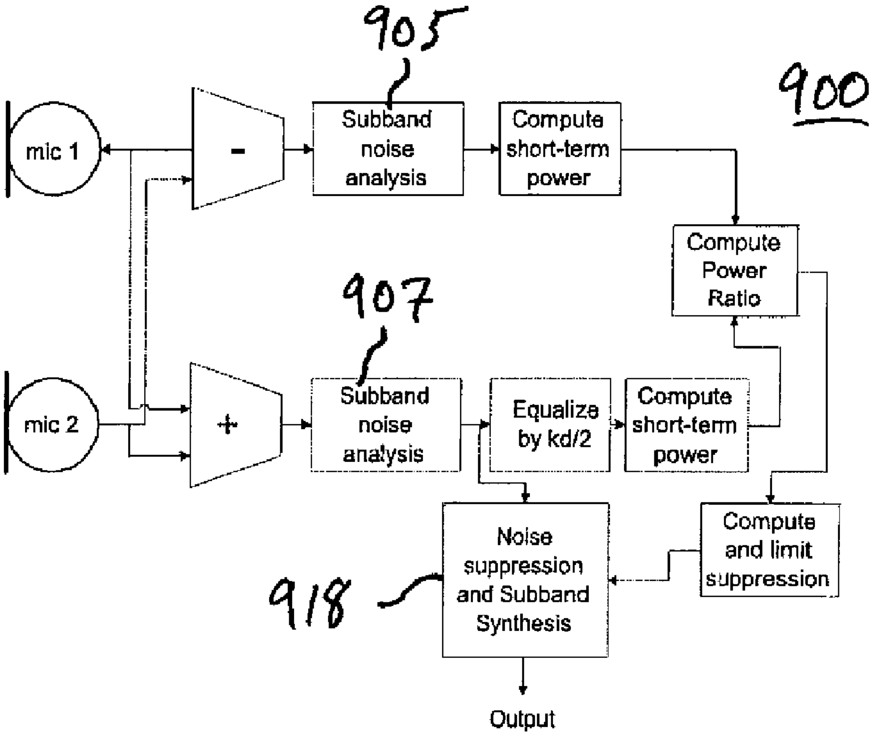
FIG. 9 shows a block diagram of a two-element microphone array spatial noise suppression system according to another embodiment of the present invention.

FIG. 9 shows a block diagram of a two-element microphone array spatial noise suppression system 900, according to another embodiment of the present invention. SNS system 900 is similar to SNS system 600 of FIG. 6 with analogous elements performing analogous functions, except that SNS system 900 employs frequency subband processing, in which the difference and sum signals are each separated into multiple subbands (905 and 907, respectively) using a dual-channel subband analysis and synthesis filterbank that independently computes and limits suppression level for each subband. Note that the noise suppression processing (918) is applied independently to different sum signal subbands. If the number of subbands is constrained to a reasonable value, then the additional computation should be minimal since the computation of the suppression values involves just adds and multiplies. An added advantage of the dual-channel subband implementation of FIG. 9 is that suppression can simultaneously operate on reducing spatially separated signals that do not have shared, overlapping subbands. This added degree of freedom should enable better performance over the simpler single-channel implementation shown in FIG. 6.

Although FIG. 9 shows equalization being performed on the sum signal subbands prior to the power computation, in alternative subband implementations, equalization can be performed on the subband powers or even on the subband power ratios.

Self-Calibration and Modal Position Flexibility

As mentioned in previous sections, the basic detection algorithm relies on an array difference output, which implies that both microphones should be reasonably calibrated. Another challenge for the basic algorithm is that there is an explicit assumption that the desired signal arrives from the broadside direction of the array. Since a typical application for the spatial noise algorithm is cell phone audio pick-up, one should also handle the design issue of having a close-talking or nearfield source. Nearfield sources have high-wavenumber components, and, as such, the ratio of the difference and sum arrays is quite different from those that would be observed from farfield sources. (It actually turns out that asymmetric nearfield source locations result in better farfield noise rejection, as will be described in more detail later in this specification.) Modal variation of close-talking (nearfield) sources could result in undesired suppression if one used the basic algorithm as outlined above. Fortunately, there is a modification to the basic implementation that addresses both of these issues.

Figure 10:
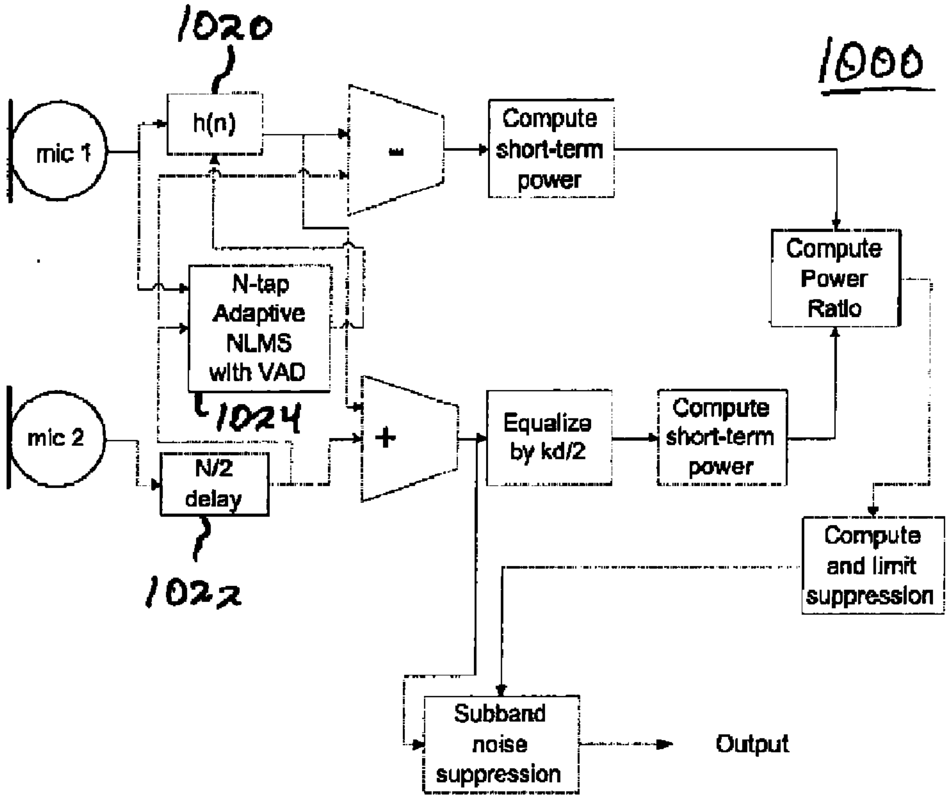
FIG. 10 shows a block diagram of a two-element microphone array spatial noise suppression system according to yet another embodiment of the present invention.

FIG. 10 shows a block diagram of a two-element microphone array spatial noise suppression system 1000, according to yet another embodiment of the present invention. SNS system 1000 is similar to SNS system 600 of FIG. 6 with analogous elements performing analogous functions, except that SNS system 1000 employs adaptive filtering to allow for self-calibration of the array and modal-angle variability (i.e., flexibility in the position of the desired nearfield source). In particular, SNS system 1000 has a short-length adaptive filter 1020 in series with one of the microphone channels. To allow for a causal filter that accounts for sound propagation from either direction relative the microphone axis, the unmodified channel is delayed (1022) by an amount that depends on the length of filter 1020 (e.g., one-half of the filter length). A normalized least-mean-square (NLMS) process 1024 is used to adaptively update the taps of filter 1020 to minimize the difference between the two input signals in a minimum least-squares way. NLMS process 1024 is preferably implemented with voice-activity detection (VAD) in order to update the filter tap values based only on suitable audio signals. One issue is that it might not be desirable to allow the adaptive filter to adapt during a noise-only condition, since this might result in a temporal variation in the outputs that might result in temporal distortion to the processed output signal. Whether this is a real problem or not has to be determined with real-world experimentation.

It might be desirable to filter both input channels to exclude signals that are out of the desired frequency band. For example, using the third microphone 703 shown in FIG. 7 as a reference, one could use two adaptive filters like filter 1020 shown in FIG. 10, to adjust the two sensing microphones 702 shown in FIG. 7.

Aside from allowing one to self-calibrate the array, using an adaptive filter also allows for the compensation of modal variation in the orientation of the array relative to the desired source. Flexibility in modal orientation of a handset would be enabled for any practical handset implementation. Also, as mentioned earlier, a close-talking handset application results in a significant change in the ratio of the sum and difference array signal powers relative to farfield sources. If one used the farfield model for suppression, then a nearfield source could be suppressed if the orientation relative to the array varied over a large incident angle variation. Thus, having an adaptive filter in the path allows for both self-calibration of the array as well as variability in close-talking modal handset position. For the case of a nearfield source, the adaptive filter will adjust the two microphones to form a spatial zero in the array response rather than a null. The spatial zero is adjusted by the adaptive filter to minimize the amount of desired nearfield signal from entering into the computed difference signal.

Although not shown in the figures, the adaptive filtering of FIG. 10 could be combined with the subband processing of FIG. 9 to provide yet another embodiment of the present invention.

Figure 11:
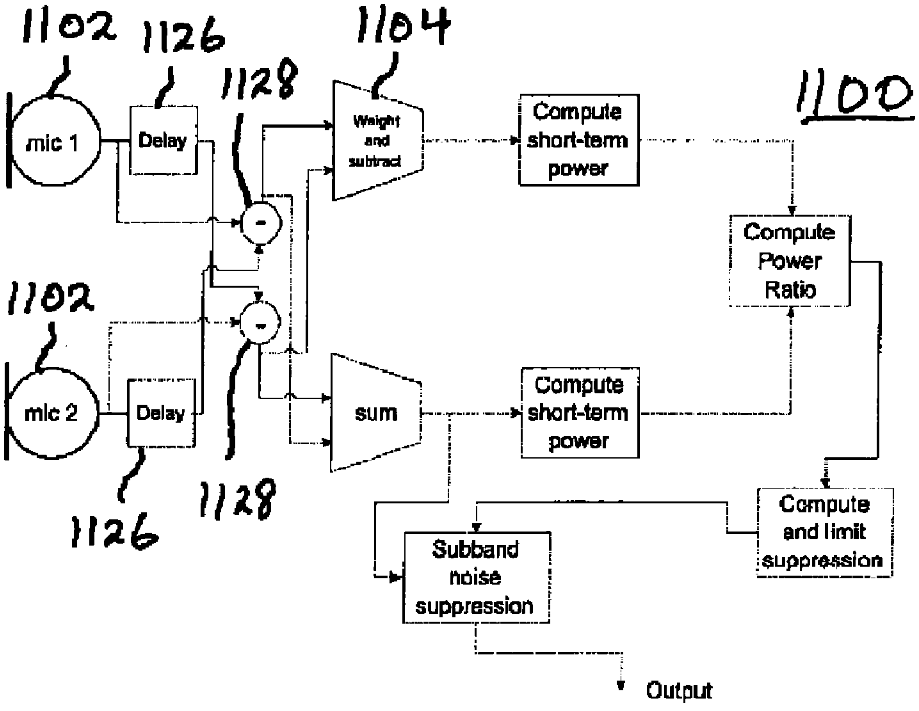
FIG. 11 shows a block diagram of a two-element microphone array spatial noise suppression system according to yet another embodiment of the present invention.

FIG. 11 shows a block diagram of a two-element microphone array spatial noise suppression system 1100, according to yet another embodiment of the present invention. SNS system 1100 is similar to SNS system 600 of FIG. 6 with analogous elements performing analogous functions, except that SNS system 1100 pre-processes signals from two omnidirectional microphones 1102 to remove the (kd/2) equalization filtering of the sum signal. In particular, for each omni microphone 1102, a delayed version (1126) of the corresponding omni signal is subtracted (1128) from the other microphone's omni signal to form front-facing and back-facing cardioids (or possible other first-order patterns). By weighting and subtracting (1104) the opposite-facing cardioids, it is possible to form a difference signal, where the null does not point in the broadside direction. This steering of the null can be done either adaptively or from other means that identifies the direction of the desired source. In an alternative implementation, delays 1126 and subtraction nodes 1128 can be eliminated by using opposite-facing first-order differential (e.g., cardioid) microphones in place of omni microphones 1102.

Asymmetric Nearfield Operation

Placing an adaptive filter into the front-end processing to allow self-calibration for SNS as shown in FIG. 11 allows modal variation and self-calibration of the microphone array. One side benefit of generalizing the structure of SNS to include the adaptive filter in the front-end is that nearfield sources force the adaptive filter to match the large variations in level typical in nearfield applications. By forcing the requisite null of a nearfield source by adaptive minimization, farfield sources have a power ratio $\mathfrak{R}_N$ that will be closer to 0 dB and therefore can be attenuated as undesired spatial noise. This effect is similar to standard close-talking microphones, where, due to the proximity effect, a dipole microphone behaves like an omnidirectional microphone for nearfield sources and like a dipole for farfield sources, thereby potentially giving a 1/f SNR increase. Actual SNR increase depends on the distance of the source to the close-talking microphone as well as the source frequency content. A nearfield differential response also exhibits a sensitivity variation that is closer to $1/r^2$ versus 1/r for farfield sources. SNR gain for nearfield sources relative to farfield sources for close-talking microphones has resulted in such microphones being commonly used for moderate and high background noise environments.

One can therefore exploit an asymmetrical arrangement of the microphones for nearfield sources to improve the suppression of farfield sources in a fashion similar to that of close-talking microphones. Thus, it is advantageous to use an "asymmetric" placement of the microphones where the desired source is close to the array such as in cellular phones and communication headsets. Since the endfire orientation is "asymmetrical" relative to the talker's mouth (each microphone is not equidistant), this would be a reasonable geometry since it also offers the possibility to use the microphones as a superdirectional beamformer for farfield pickup of sound (where the desired sound source is not in the nearfield of the microphone array).

Computer Model Results

Matlab programs were written to simulate the response of the spatial suppression algorithm for basic and NLMS implementations as well as for free and diffuse acoustic fields. First, a diffuse field was simulated by choosing a variable number of random directions for uncorrelated noise sources. The angles were chosen from uniformly distributed directions over 4π space.

Figure 12:
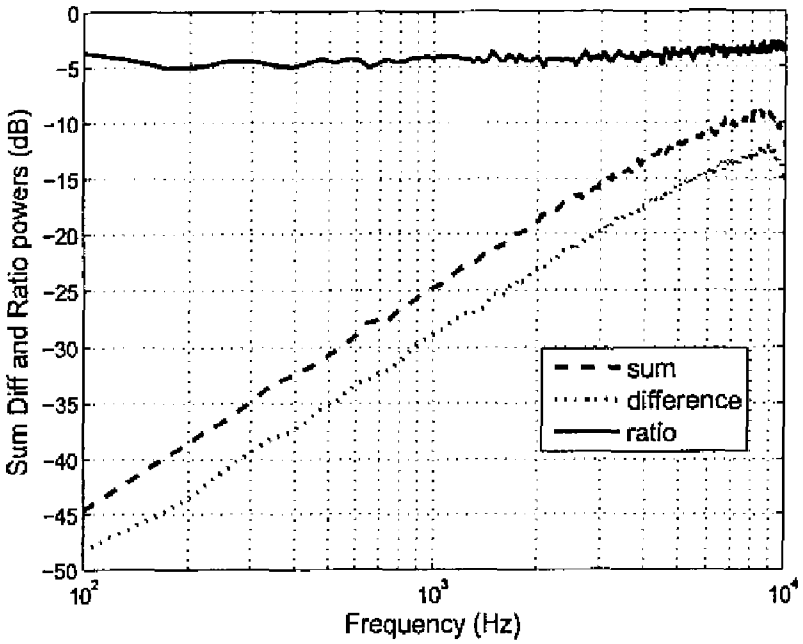
FIG. 12 shows sum and difference powers from a simulated diffuse sound field using 100 random directions of independent white noise sources.

FIG. 12 shows a result for 100 independent angles. In particular, FIG. 12 shows sum and difference powers from a simulated diffuse sound field using 100 random directions of independent white noise sources. The expected ratio is −4.8 dB for the case of the desired source impinging from the broadside direction, and the ratio shown in FIG. 9 is very close to the predicted value. A rise in the ratio at low frequencies is most likely due to numerical error due to noise from simulation processing that uses a large up-and-down sample ratio to obtain the model results.

Figure 13:
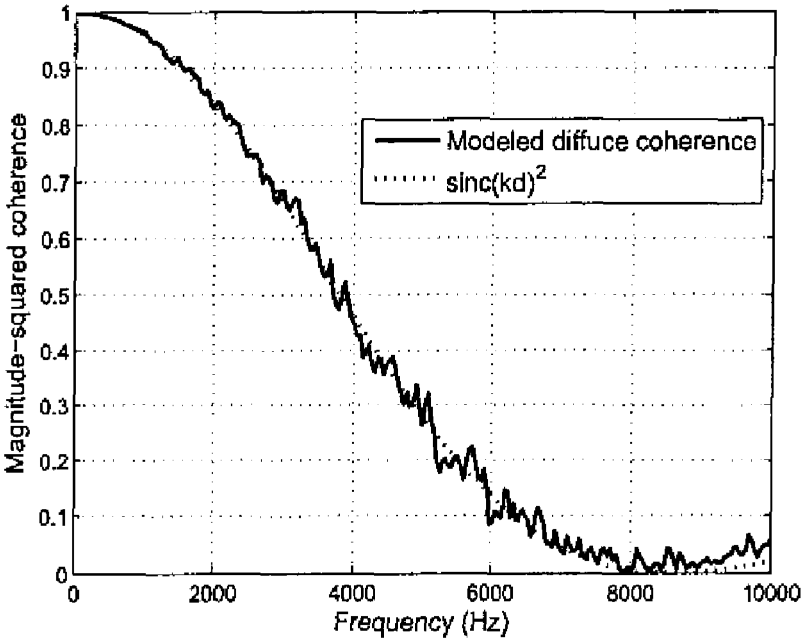
FIG. 13 is a plot that shows the measured magnitude-squared coherence for 200 randomly incident uncorrelated noise sources onto a 2-cm spaced microphone.

FIG. 13 is a plot that shows the measured magnitude-squared coherence for 200 randomly incident uncorrelated noise sources onto a 2-cm spaced microphone. For comparison purposes, the theoretical value $\mathrm{sinc}^2(kd)$ is also plotted in FIG. 10.

Two spacings of 2 cm and 4 cm were chosen to allow array operation up to 8 kHz in bandwidth. In a first set of experiments, two microphones were assumed to be ideal cardioid microphones oriented such that their maximum response was pointing in the broadside direction (normal to the array axis). A second implementation used two omnidirectional microphones spaced at 2 cm with a desired single talking source contaminated by a wideband diffuse noise field. An overall farfield beampattern can be computed by the Pattern Multiplication Theorem, which states that the overall beampattern of an array of directional transducers is the product of the individual transducer directivity and an array of nondirectional transducers having the same array geometry.

Figure 14:
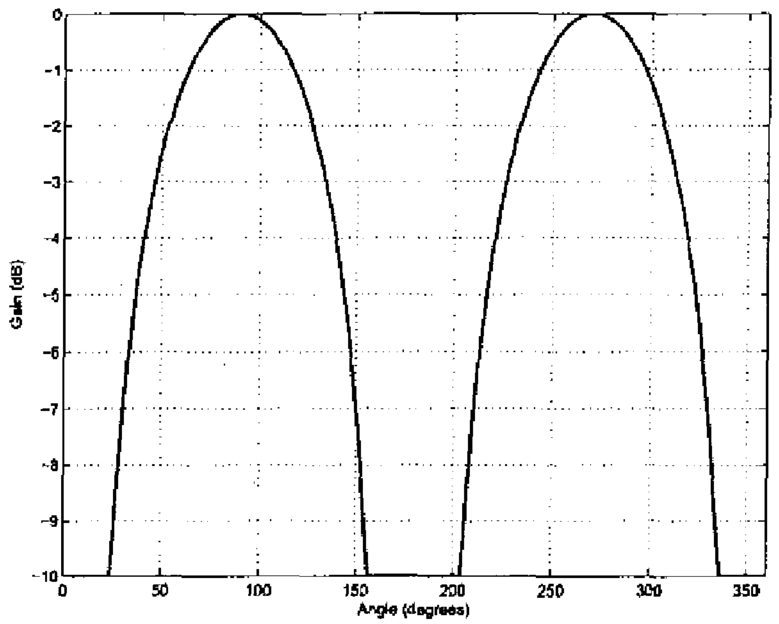
Figure 15:
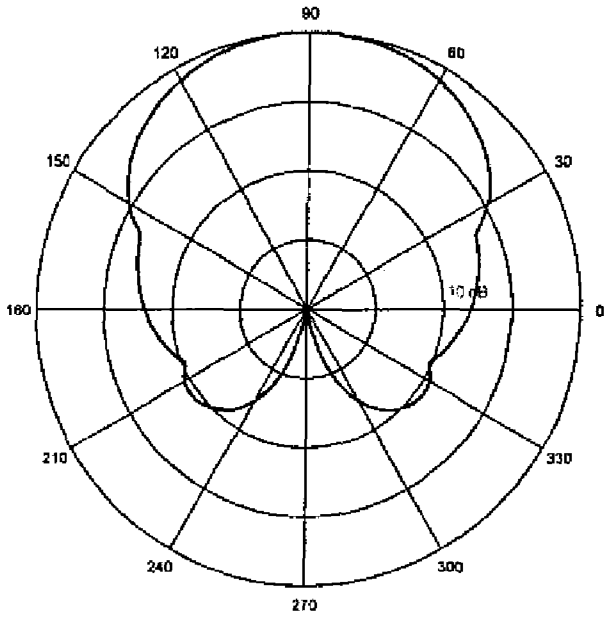
FIG. 15 shows simulated polar response for the same array and maximum suppression.

FIGS. 14 and 15 show computer-model results for a two-element cardioid array at 1 kHz. In particular, FIG. 14 shows spatial suppression for 4-cm spaced cardioid microphones with a maximum suppression level of 10 dB at 1 kHz, while FIG. 15 shows simulated polar response for the same array and maximum suppression. FIG. 14 shows the $\sin^2(\theta)$ suppression function as given in Equation (23).

Figure 16:
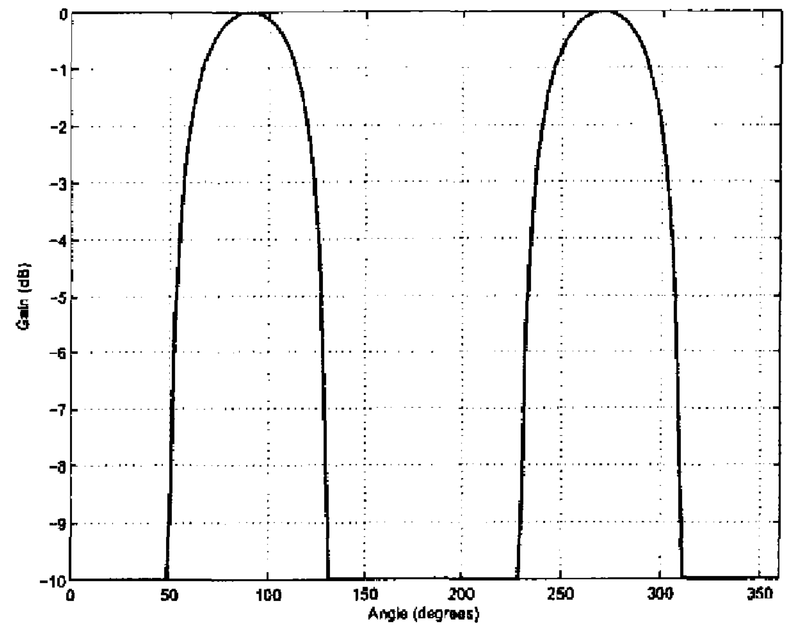
FIGS. 16 and 17 show computer-model results for the same 4-cm spaced cardioid array and the same 10-dB maximum suppression level at 4 kHz.
Figure 17:
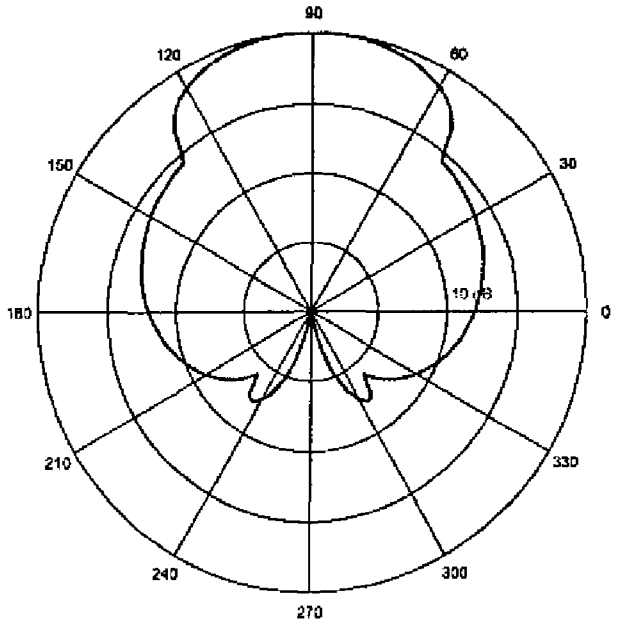

FIGS. 16 and 17 show computer-model results for the same 4-cm spaced cardioid array and the same 10-dB maximum suppression level at 4 kHz. At this frequency and above, the approximation used to equalize the sum array begins to deviate from the precise equalization that would be required using the exact expressions. One can also see the narrowing of the beampattern at this frequency where the sum array's spatial response begins to narrow the underlying cardioid pattern. A combination of these effects results in the changes in the computed beampatterns for the frequencies of 1 kHz and 4 kHz.

Experimental Measurements

To verify the operation of the spatial noise suppression algorithm in real-world acoustic environments, the directivity pattern was measured for a few cases. First, a farfield source was positioned at 0.5 m from a 2-cm spaced omnidirectional array. The array was then rotated through 360 degrees to measure the polar response of the array. Since the source is within the critical distance of the microphone, which for this measurement setup was approximately 1 meter, it is expected that this set of measurements would resemble results that were obtained in a free field.

A second set of results was taken to compare the suppression obtained in a diffuse field, which is experimentally approximated by moving the source as far away as possible from the array, placing the bulk of the microphone input signal as the reverberant sound field. By comparing the power of a single microphone, one can obtain the amount of suppression that would be applied for this acoustic field.

Finally, measurements were made in a close-talking application for both a single farfield interferer and diffuse interference. In this setup, a microphone array was mounted on the pinna of a Bruel & Kjaer HATS (Head and Torso Simulator) system with a Fostex 6301B speaker placed 50 cm from the HATS system, which was mounted on a Bruel & Kjaer 9640 turntable to allow for a full 360-degree rotation in the horizontal plane.

CONCLUSIONS

This specification has described a new dual-microphone noise suppression algorithm with computationally efficient processing to effect a spatial suppression of sources that do not arrive at the array from the desired direction. The use of an NLMS adaptive calibration scheme was shown that allows for the desired flexibility of allowing for calibration of the microphones for effective operation. Using an adaptive filter on one of the microphone array elements also allows for a wide variation in the modal position of close-talking sources, which would be common in cellular phone handset and headset applications.

It was shown that the suppression algorithm for farfield sources is axisymmetric and therefore noise signals arriving from the same angle as the desired source direction will not be attenuated. To remove this symmetry, one could use cardioid microphones or other directional microphone elements in the array to effectively reduce unwanted noise arriving from the source angle direction. Computer model and experimental results were shown to validate the free-space far-field condition.

Two possible implementations were shown: one that requires only a single channel of subband noise suppression and a more general two-channel suppression algorithm. Both of these cases were shown to be compatible with the adaptive self-calibration and modal position variation of desired close-talking sources. It is suggested that a solution shown in this specification would be a good solution for hands-free audio input to a laptop personal computer. A real-time implementation can be used to tune this algorithm and to investigate real-world performance.

Although the present invention is described in the context of systems having two or three microphones, the present invention can also be implemented using more than three microphones. Note that, in general, the microphones may be arranged in any suitable one-, two-, or even three-dimensional configuration. For instance, the processing could be done with multiple pairs of microphones that are closely spaced and the overall weighting could be a weighted and summed version of the pair-weights as computed in Equation (24). In addition, the multiple coherence function (reference: Bendat and Piersol, "Engineering applications of correlation and spectral analysis", Wiley Interscience, 1993.) could be used to determine the amount of suppression for more than two inputs. The use of the difference-to-sum power ratio can also be extended to higher-order differences. Such a scheme would involve computing higher-order differences between multiple microphone signals and comparing them to lower-order differences and zero-order differences (sums). In general, the maximum order is one less than the total number of microphones, where the microphones are preferably relatively closely spaced.

As used in the claims, the term "power" in intended to cover conventional power metrics as well as other measures of signal level, such as, but not limited to, amplitude and average magnitude. Since power estimation involves some form of time or ensemble averaging, it is clear that one could use different time constants and averaging techniques to smooth the power estimate such as asymmetric fast-attack, slow-decay types of estimators. Aside from averaging the power in various ways, one can also average $\Re_N$ which is the ratio of sum and difference signal powers by various time-smoothing techniques to form a smoothed estimate of $\Re_N$ In a system having more than two microphones, audio signals from a subset of the microphones (e.g., the two microphones having greatest power) could be selected for filtering to compensate for phase difference. This would allow the system to continue to operate even in the event of a complete failure of one (or possibly more) of the microphones.

The present invention can be implemented for a wide variety of applications having noise in audio signals, including, but certainly not limited to, consumer devices such as laptop computers, hearing aids, cell phones, and consumer recording devices such as camcorders. Notwithstanding their relatively small size, individual hearing aids can now be manufactured with two or more sensors and sufficient digital processing power to significantly reduce diffuse spatial noise using the present invention.

Although the present invention has been described in the context of air applications, the present invention can also be applied in other applications, such as underwater applications. The invention can also be useful for removing bending wave vibrations in structures below the coincidence frequency where the propagating wave speed becomes less than the speed of sound in the surrounding air or fluid.

Although the calibration processing of the present invention has been described in the context of audio systems, those skilled in the art will understand that this calibration estimation and correction can be applied to other audio systems in which it is required or even just desirable to use two or more microphones that are matched in amplitude and/or phase.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for processing audio signals, comprising the steps of:
- (a) generating an audio difference signal;
- (b) generating an audio sum signal;
- (c) generating a difference-signal power based on the audio difference signal;
- (d) generating a sum-signal power based on the audio sum signal;
- (e) generating a power ratio based on the difference-signal power and the sum-signal power;
- (f) generating a suppression value based on the power ratio; and
- (g) performing noise suppression processing for at least one audio signal based on the suppression value to generate at least one noise-suppressed output audio signal.

2. The invention of claim 1, wherein the audio difference and sum signals are based on signals from two microphones.

3. The invention of claim 2, wherein the two microphones are of different order.

4. The invention of claim 1, wherein:
- step (a) comprises generating the audio difference signal based on a difference between audio signals from two microphones; and
- step (b) comprises generating the audio sum signal based on a sum of the audio signals from the two microphones.

5. The invention of claim 4, wherein the two microphones are two omni microphones.

6. The invention of claim 1, wherein:
- step (a) comprises generating the audio difference signal using a directional microphone; and
- step (b) comprises generating the audio sum signal using a non-directional microphone.

7. The invention of claim 6, wherein:
- the directional microphone is a cardioid microphone; and
- the non-directional microphone is an omni microphone.

8. The invention of claim 1, wherein step (d) comprises the steps of:
- (d1) filtering the audio sum signal to generate a filtered sum signal; and
- (d2) generating the sum-signal power based on the filtered sum signal.

9. The invention of claim 8, wherein step (d1) comprises first-order high-pass filtering the audio sum signal to generate the filtered sum signal.

10. The invention of claim 9, wherein step (d1) comprises filtering the audio sum signal by (kd/2) to generate the filtered sum signal, wherein wavenumber $k=\omega/c$, $\omega$ is angular frequency, c is speed of sound, and d is distance between two microphones used to generate the audio difference and sum signals.

11. The invention of claim 1, wherein step (c) comprises the steps of:
- (c1) filtering the audio difference signal to generate a filtered difference signal; and
- (c2) generating the difference-signal power based on the filtered difference signal.

12. The invention of claim 11, wherein step (c1) comprises first-order low-pass filtering the audio difference signal to generate the filtered difference signal.

13. The invention of claim 1, wherein the difference-signal and sum-signal powers are time-smoothed power values.

14. The invention of claim 1, wherein the noise suppression processing is applied to at least one of the audio sum signal and the audio difference signal to generate a single-channel noise-suppressed output signal.

15. The invention of claim 1, wherein:
- the audio difference and sum signals are generated from first and second microphones; and
- the noise suppression processing is performed on an audio signal from a third microphone.

16. The invention of claim 1, wherein:
- the audio difference and sum signals are generated from two microphones; and
- the noise suppression processing is performed on each audio signal from the two microphones to generate two noise-suppressed output audio signals.

17. The invention of claim 1, wherein steps (c)-(g) are independently implemented for two or more different subbands in the audio difference and sum signals.

18. The invention of claim 1, wherein:
- the audio difference and sum signals are generated by differencing and summing first and second audio signals from two microphones; and a filter is applied to filter the first audio signal prior to generating the audio difference and sum signals.

19. The invention of claim 18, wherein the second audio signal is delayed by an amount that depends on the filter length prior to generating the audio difference and sum signals.

20. The invention of claim 18, wherein the filter is adaptively updated using a normalized least-mean-square (NLMS) process based on the first audio signal and a delayed version of the second audio signal.

21. The invention of claim 1, wherein:

the audio difference signal is generated by weighting and differencing two opposite-facing directional audio signals; and the audio sum signal is generated by summing the two opposite-facing directional audio signals.

22. The invention of claim 21, wherein the weighting and differencing steers a null or spatial zero in the audio difference signal towards a non-broadside direction.

23. The invention of claim 21, wherein the two opposite-facing directional audio signals are generated by two opposite-facing first-order directional microphones.

24. The invention of claim 23, wherein the two opposite-facing first-order directional microphones are two opposite-facing cardioid microphones.

25. The invention of claim 21, wherein the two opposite-facing directional audio signals are generated by:

(1) generating a first directional audio signal by differencing a first audio signal from a first omni microphone and a delayed version of a second audio signal from a second omni microphone; and (2) generating a second directional audio signal by differencing a delayed version of the first audio signal and the second audio signal.

26. The invention claim 1, wherein the suppression value is generated using a function in which level of suppression changes monotonically with the power ratio.

27. The invention of claim 26, wherein, according to the function:

(i) the suppression value is set to a first suppression level for power ratio values less than a first specified power-ratio threshold;

(ii) the suppression value is set to a second suppression level for power ratio values greater than a second specified power-ratio threshold; and (iii) the suppression value varies monotonically between the first and second suppression levels for power ratio values between the first and second specified power-ratio thresholds.

28. The invention of claim 1, wherein the noise suppression processing is single-channel noise suppression processing.

29. A signal processor for processing audio signals generated by two or more microphones receiving acoustic signals, the signal processor adapted to:

(a) generate an audio difference signal based on one or more of the audio signals;

(b) generate an audio sum signal based on one or more of the audio signals;

(c) generate a difference-signal power based on the audio difference signal;

(d) generate a sum-signal power based on the audio sum signal;

(e) generate a power ratio based on the difference-signal power and the sum-signal power;

(f) generate a suppression value based on the power ratio; and (g) perform noise suppression processing for at least one audio signal based on the suppression value to generate at least one noise-suppressed output audio signal;

wherein the signal processor is hardware implemented.

30. The invention of claim 29, wherein the signal processor is implemented on a single integrated circuit.

31. The invention of claim 29, wherein the noise suppression processing is single-channel noise suppression processing.

32. A consumer device comprising:

(1) two or more microphones configured to receive acoustic signals and to generate audio signals; and (2) a signal processor adapted to:

(a) generate an audio difference signal based on one or more of the audio signals;

(b) generate an audio sum signal based on one or more of the audio signals;

(c) generate a difference-signal power based on the audio difference signal;

(d) generate a sum-signal power based on the audio sum signal;

(e) generate a power ratio based on the difference-signal power and the sum-signal power;

(f) generate a suppression value based on the power ratio; and (g) perform noise suppression processing for at least one audio signal based on the suppression value to generate at least one noise-suppressed output audio signal.

33. The invention of claim 32, wherein the consumer device is a laptop computer.

34. The invention of claim 32, wherein the consumer device is a mobile communication device.

35. The invention of claim 32, wherein the noise suppression processing is single-channel noise suppression processing.

* * * * *

UNITED STATES PATENT AND TRADEMARK OFFICE

CERTIFICATE OF CORRECTION

PATENT NO. : 8,098,844 B2
APPLICATION NO. : 12/089545
DATED : January 17, 2012
INVENTOR(S) : Gary W. Elko It is certified that error appears in the above-identified patent and that said Letters Patent is hereby corrected as shown below:

On the Title page, section (22) PCT Filed, please replace “Nov. 5, 2006” with --Nov. 15, 2006--.

Signed and Sealed this
Tenth Day of July, 2012

David J. Kappos

David J. Kappos
*Director of the United States Patent and Trademark Office*